US011641680B2

(12) United States Patent
Shi et al.

(10) Patent No.: US 11,641,680 B2
(45) Date of Patent: May 2, 2023

(54) METHODS AND SYSTEMS FOR HANDLING USER EQUIPMENT ASSOCIATED INFORMATION

(71) Applicant: ZTE CORPORATION, Guangdong (CN)

(72) Inventors: Xiaojuan Shi, Guangdong (CN); He Huang, Guangdong (CN); Jianwu Dou, Guangdong (CN); Nan Zhang, Guangdong (CN); Li Yang, Guangdong (CN); Wei Cao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 81 days.

(21) Appl. No.: 17/213,914

(22) Filed: Mar. 26, 2021

(65) Prior Publication Data
US 2021/0282201 A1    Sep. 9, 2021

Related U.S. Application Data

(63) Continuation of application No. PCT/CN2018/107956, filed on Sep. 27, 2018.

(51) Int. Cl.
*H04W 76/12* (2018.01)
*H04W 8/28* (2009.01)
(Continued)

(52) U.S. Cl.
CPC ............ *H04W 76/12* (2018.02); *H04W 8/28* (2013.01); *H04W 36/0033* (2013.01);
(Continued)

(58) Field of Classification Search
CPC ... H04W 76/12; H04W 8/28; H04W 36/0033; H04W 36/32; H04W 68/005; H04W 80/02; H04W 84/06
(Continued)

(56) References Cited

U.S. PATENT DOCUMENTS 9,818,136 B1 *  11/2017  Hoffberg ............... G07F 17/32
2011/0164554 A1 *  7/2011  Jacks ................. H04B 7/18558
                                                                    370/320
(Continued)

FOREIGN PATENT DOCUMENTS

CN           107592152 A        1/2018

OTHER PUBLICATIONS

Huawei "Discussion on Non Terrestrial Network", 3GPP TSG RAN Meeting #101, R3-184939, Aug. 20-24, 2018, Gothenburg, 9 pages.
Ericsson "Data forwarding for Retrieve UE Context in case of RRC connection re-establishment", 3GPP TSG-RAN Meeting #101, R3-185336, Aug. 20-24, 2018, Gothenburg, 44 pages.
(Continued)

*Primary Examiner* — Nghi H Ly
(74) *Attorney, Agent, or Firm* — Duane Morris LLP

(57) ABSTRACT

Methods and systems for handling UE associated information in non-terrestrial networks are disclosed. In one embodiment, a method performed by a satellite head station, includes: translating a first uplink (UL) tunnel address associated with a core network to a second UL tunnel address associated with the satellite head station, wherein the first and second UL tunnel addresses are each associated with a packet data unit (PDU) session established between the core network and a user equipment device (UE); transmitting the second UL tunnel address to a first satellite base station; and receiving UL data associated with the PDU session from the first satellite base station, wherein a UL tunnel address destination associated with the received UL data is set as the second UL tunnel address.

20 Claims, 9 Drawing Sheets

(51) Int. Cl.
*H04W 36/00* (2009.01)
*H04W 36/32* (2009.01)
*H04W 68/00* (2009.01)
*H04W 80/02* (2009.01)
*H04W 84/06* (2009.01)

(52) U.S. Cl.
CPC ......... *H04W 36/32* (2013.01); *H04W 68/005* (2013.01); *H04W 80/02* (2013.01); *H04W 84/06* (2013.01)

(58) Field of Classification Search
USPC ................ 370/329, 328, 338, 341, 345, 350
See application file for complete search history.

(56) References Cited

U.S. PATENT DOCUMENTS

2016/0330787 A1 11/2016 Patel et al.
2017/0041830 A1 2/2017 Davis et al.

OTHER PUBLICATIONS

Thales, "NTN Overview and scenarios", 3GPP TSG RAN WG3 Meeting #101, R3-184524, Gothenburg, Sweden, Aug. 20-24, 2018, 9 pages.
Thales, "Non-Terrestrial Network overview", 3GPP TSG RAN Meeting 76, RP-170929, West Palm Beach, USA, Jun. 5-9, 2017, 18 pages.

* cited by examiner

METHODS AND SYSTEMS FOR HANDLING USER EQUIPMENT ASSOCIATED INFORMATION

TECHNICAL FIELD

The disclosure relates generally to wireless communications and, more particularly, to methods and systems for performing mobility management in non-terrestrial networks.

BACKGROUND

With the development of the new radio (NR) access technologies (i.e., 5G), a broad range of use cases including enhanced mobile broadband, massive machine-type communications (MTC), critical MTC, etc., can be realized. To expand the utilization of NR access technologies, 5G connectivity via satellites is being considered as a promising application. In contrast to the terrestrial networks where all communication nodes (e.g., base stations) are located on the earth, a network incorporating satellites and/or airborne vehicles to perform some or all of the functions of terrestrial base stations is referred to as a non-terrestrial network.

Spaceborne vehicles include satellites such as Low Earth Orbiting (LEO) satellites, Medium Earth Orbiting (MEO) satellites, Geostationary Earth Orbiting (GEO) satellites, as well as Highly Elliptical Orbiting (HEO) satellites, collectively referred to as "satellites" herein. Airborne vehicles include Unmanned Aircraft Systems (UAS) including tethered UAS and Lighter than Air UAS (LTA), Heavier than Air UAS (HTA), and High Altitude Platforms UAS (HAPs), collectively referred to herein as "UAS platforms."

In some geographic areas, terrestrial networks are not deployed due to economic reasons (e.g., expectation for revenues does not meet a minimum threshold for profitability). Additionally, natural disasters (e.g. earthquakes, floods, etc.) can result in a temporary outage or total destruction of terrestrial network infrastructures, which then need to be repaired or replaced. With the deployment of non-terrestrial networks, service ubiquity and continuity can be achieved even in these "unserved" or "underserved" areas. Furthermore, due to the reduced vulnerability of spaceborne or airborne vehicles to physical attacks and natural disasters, the development of non-terrestrial networks is especially of interest to public safety or railway communication systems.

In non-terrestrial networks, a satellite may be in a Geostationary Earth orbit (GEO), referred to herein as a "GEO satellite," or a Non-GEO orbit (i.e., Low Earth Orbit and Medium Earth Orbit), referred to herein as "Non-GEO satellites." A GEO satellite remains relatively fixed in location with respect to earth such that it appears to remain at a fixed position in the sky to observers on the ground. However, the Non-GEO satellite moves over the earth, such that it changes its position in the sky over time to observers on the ground. Since the Non-GEO satellite keeps moving/flying over the earth, it must eventually change its wireless connection to an earth station communicating with the satellite. Additionally, the movement of the Non-GEO satellite would cause user equipment devices (UEs), such as mobile terminals (MTs), served by the satellite to change their connections from one satellite to another from time to time. For instance, a Non-GEO satellite can fly over a particular area that is approximately 200 kilometers (km) in diameter in just 10 minutes. Thus, MTs in this particular area must be handed over from one satellite to a succeeding satellite that flies over the same area every 10 minutes.

In conventional terrestrial networks, the mechanism and techniques for handling UE associated information between Radio Access Network (RAN) nodes, or between a RAN node and Core Network (CN) are configured to accommodate and manage the mobility of moving MTs. UE associated information includes information which is specific for an individual UE, such as handover-related information, path switch information, UE context information, etc. However, in non-terrestrial networks with high-speed satellites, resulting in rapidly moving geographic cells, applying existing UE associated information handling techniques to the non-terrestrial networks would result in a number of challenges such as, for example, large signaling overhead, large UE associated information handling delays, etc. Thus, existing systems and methods for handling UE associated information are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a satellite head station, includes: translating a first uplink (UL) tunnel address associated with a core network to a second UL tunnel address associated with the satellite head station, wherein the first and second UL tunnel addresses are each associated with a packet data unit (PDU) session established between the core network and a user equipment device (UE); transmitting the second UL tunnel address to a first satellite base station; and receiving UL data associated with the PDU session from the first satellite base station, wherein a UL tunnel address destination associated with the received UL data is set as the second UL tunnel address.

In another embodiment, a method performed by a satellite head station, includes: during a first time period, receiving UE context information from a first satellite base station, wherein the UE context information is associated with a UE that is located within a first geographic cell of the first satellite base station and is in an inactive state; and storing the UE context information in a memory of the satellite head station.

In a further embodiment, an aspect of the invention provides a non-transitory computer readable medium storing computer-executable instructions that when executed perform the above methods.

In yet further embodiments, a satellite head station includes: at least one processor configured to translate a first uplink (UL) tunnel address associated with a core network to a second UL tunnel address associated with the satellite head station, wherein the first and second UL tunnel addresses are each associated with a packet data unit (PDU) session established between the core network and a user equipment device (UE); and a transceiver, coupled to the at least one processor, and configured to transmit the second UL tunnel address to a first satellite base station, and receive UL data associated with the PDU session from the first satellite base station, wherein the received UL data has a UL tunnel address destination set as the second UL tunnel address.

In another embodiment, a satellite head station includes: a transceiver configured to receiving UE context information from a first satellite base station during a first time period, wherein the UE context information is associated with a UE that is located within a first geographic cell of the first satellite base station and is in an inactive state; and a memory for storing the UE context information.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical terrestrial communication network includes one or more base stations (typically known as a "BS") that are located on earth (i.e., not airborne or spaceborne) that each provides geographical radio coverage, and one or more wireless user equipment devices (typically known as a "UE") that can transmit and receive data within the radio coverage. In the terrestrial communication network, a BS and a UE can communicate with each other via a communication link, e.g., via a downlink radio frame from the BS to the UE or via an uplink radio frame from the UE to the BS. The present disclosure provides systems and methods for replacing one or more terrestrial BSs with one or more satellites to provide a non-terrestrial network, in accordance with various embodiments.

Figure 1:
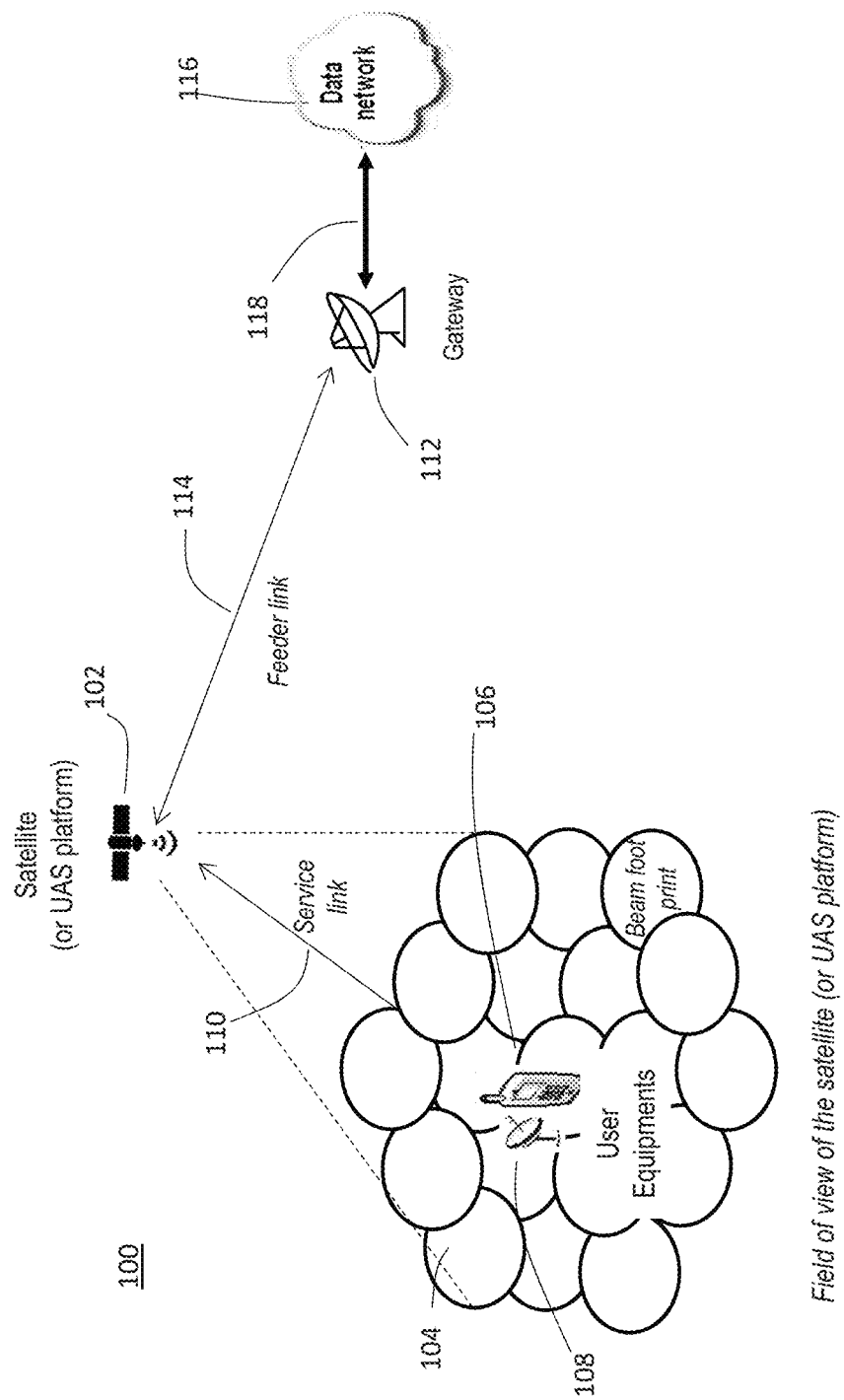
FIG. 1 illustrates an exemplary non-terrestrial network and its geographic cells in which techniques disclosed herein may be implemented, in accordance with some embodiments of the present disclosure.

FIG. 1 illustrates an exemplary scenario of a non-terrestrial (NT) network 100 in which the techniques, processes and methods described herein can be implemented, in accordance with various embodiments. As shown in FIG. 1, the NT network 100 includes at least one satellite 102, or alternatively a UAS platform 102, that provides a plurality geographic cells 104 for serving user equipment devices (UEs) 106 and 108 located in one or more of the geographic cells 104. In FIG. 1, example UEs are a mobile terminal (MT) 106 and a very small aperture terminal (VSAT) 108, which can wirelessly communicate with the satellite/UAS platform 102 via a communications link 110, such as service link or radio link in accordance with a new radio (NR) access technology (e.g., a NR-Uu interface).

Satellites and UAS platforms are collectively referred to as "non-terrestrial communication nodes" or "NT communication nodes" herein. In the following description of exemplary embodiments, a satellite is described as the NT communication node. It is understood, however, that alternative embodiments can utilize a UAS platform as the NT communication node while remaining within the scope of the invention.

Referring still to FIG. 1, the satellite 102 also communicates with a gateway or earth station 112 via a communication link 114, which may be a feeder link or radio link in accordance with NR access technologies. The gateway or earth station 112 (e.g., a head station) is communicatively coupled to a data network 116 via a communication link 118, which may be a physical link such as a fiber optic cable, for example. In accordance with various embodiments, the satellite 102 may be implemented with either a transparent or a regenerative payload. When the satellite carries a "transparent" payload (referred to herein as "transparent satellite"), it performs only radio frequency filtering, frequency conversion and/or amplification of signals on board. Hence, the waveform signal repeated by the payload is un-changed. When a satellite carries a regenerative payload (referred to herein as a "regenerative satellite"), in addition to performing radio frequency filtering, frequency conversion and amplification, it performs other signal processing functions such as demodulation/decoding, switching and/or routing, coding/decoding and modulation/demodulation on board as well. In other words, for a satellite with a regenerative payload (re, all or part of base station functions (e.g., a gNB, eNB, etc.) are implemented on board.

Figure 2A:
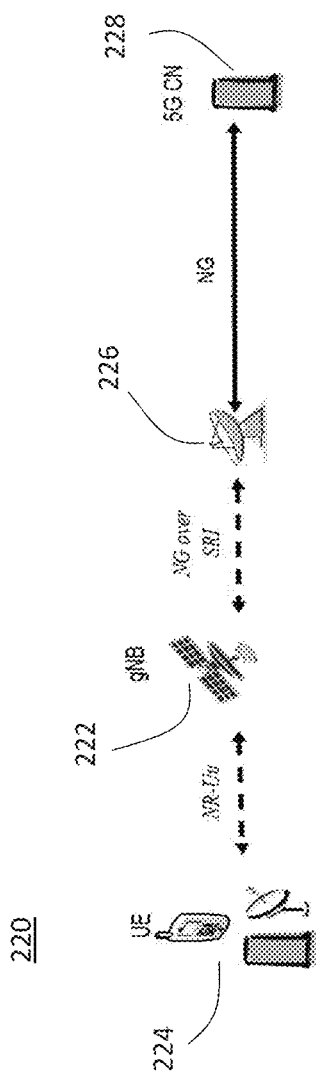
FIGS. 2A-2B illustrate scenarios of non-terrestrial networks in which techniques disclosed herein may be implemented, in accordance with some embodiments of the present disclosure.
Figure 2B:
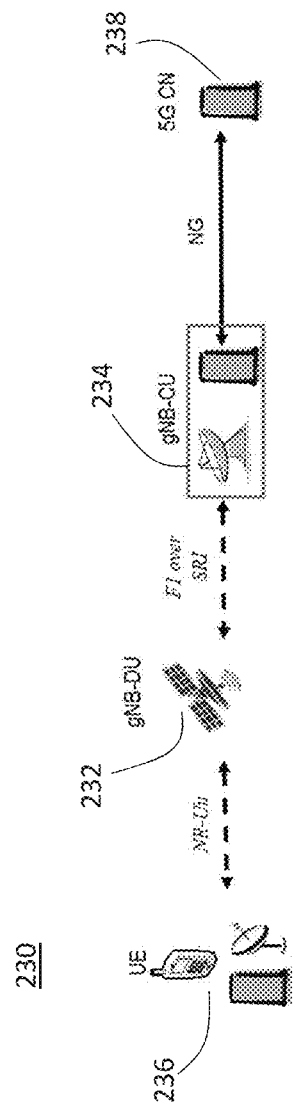

FIG. 2A illustrates a scenario in which a non-terrestrial network 220 is implemented with a regenerative satellite 222 (i.e., all functions of a base station are implemented on board), in accordance with one embodiment of the invention. In accordance with various embodiments, the satellite 222 hosts one or more complete gNBs, which terminate the NG interface(s) from the 5G core network 228 (5G CN). As shown in FIG. 2B, the satellite 222 is communicatively coupled to a gateway or satellite head station 226 via an NG over satellite radio interface (SRI) communication link, which is in turn coupled to the 5G CN 228 via a NG communication link, in accordance with some embodiments. The gateway or satellite head station 226 encapsulates NG packets for transport over the SRI.

FIG. 2B illustrates a scenario in which a non-terrestrial network 230 is implemented with a split architecture, wherein the satellite 232 is a regenerative satellite that performs the functions of a distributed unit (DU) base station (gNB-DU) in a split architecture network. In this case, the functions of a base station are split into a base station distributed unit (gNB-DU) and a base station central unit 234 (gNB-CU). In accordance with various embodiments, the satellite 232 hosts one or more gNB-DUs; the gNB-CU 234 is on the ground. In some embodiments, an F1 interface between gNB-CU 234 and gNB-DU 232 is transported over a Satellite Radio Interface (SRI). As shown in FIG. 2C, the satellite 232 serves one or more UEs 236 located in one or cells provided by the satellite 232. The gNB-CU 234 is communicatively coupled to a core network 238 via a NG interface protocol, in accordance with some embodiments.

Figure 3:
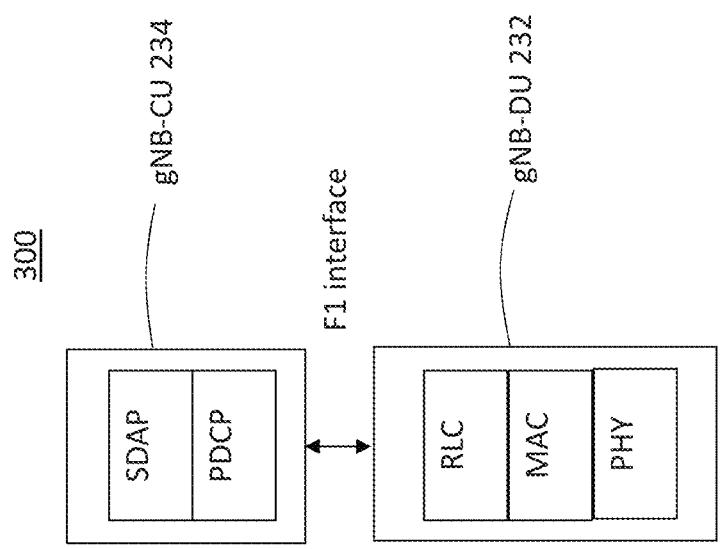
FIG. 3 illustrates a user plane protocol split architecture for new radio (NR) wherein user plane functions are split between a base station central unit (e.g., gNB-CU) and a base station distributed unit (e.g., gNB-DU), which may be incorporated with various techniques disclosed herein, in accordance with various embodiments.

FIG. 3 illustrates a user plane (UP) protocol architecture 300 defined in NR for a gNB CU-DU split architecture network. In the illustrated architecture, the SDAP (Service Data Adaptation Protocol) layer and PDCP (Packet Data Convergence Protocol) layer functions are performed by the gNB-CU 234 of FIG. 2C. While the RLC (Radio Link Control), MAC (Medium Access Control) and PHY (Physical) layers functions are performed by the gNB-DU satellite 232 of FIG. 2C. The gNB-CU 234 and gNB-DU 2332 are connected via the F1 interface.

Figure 4:
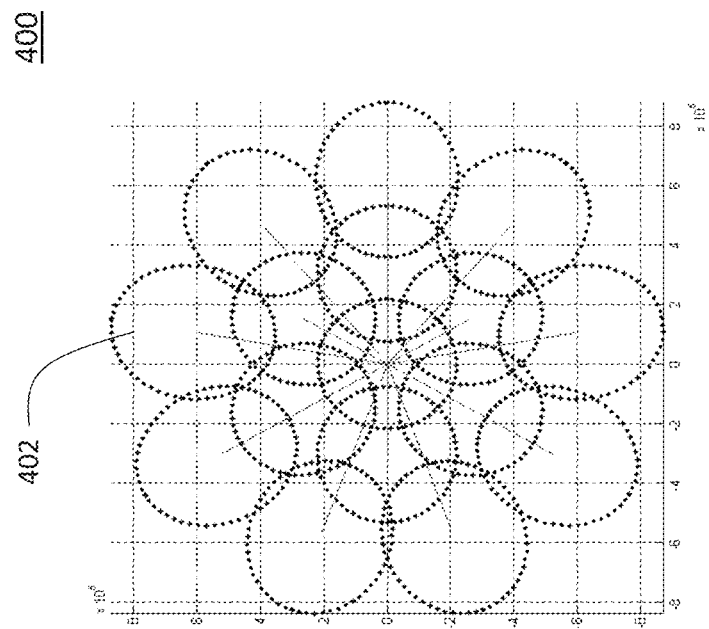
FIG. 4 illustrates an exemplary field of view of a satellite and corresponding geographic cells in which techniques disclosed herein may be implemented, in accordance with some embodiments of the present disclosure.

Typically, a satellite generates several beams over a given service area bounded by its field of view. The footprints of the beams are typically of elliptic shape each of which can be considered to be a geographic cell of the satellite. FIG. 4 illustrates an example field view 400 of a satellite and a plurality of geographic cells 402 formed by the beams (not shown). Different beams generated by a single satellite can operate with different frequencies and PCIs. In other words, from the perspective of the UE, each single elliptic beam shape radiated from the satellite can be regarded as an individual physical cell. That is, beams radiated from a single satellite can generates lots of physical cells. However, in the remaining figures of this disclosure, only a single beam or single cell from one satellite is illustrated in order to simplify the illustration for purposes of discussion.

As discussed above, non-GEO satellites are constantly flying over and moving with respect to the earth in a pre-determined orbit. Because of this constant motion of non-GEO satellites, unique UE associated information handling issues will arise. For example, due to the motion of the satellite, the UE's wireless connection will frequently change from one earth station to another in a predictable manner. Thus, UE associated information must be maintained and managed during a PDU session as the UE switches from one satellite to another.

Figure 5:
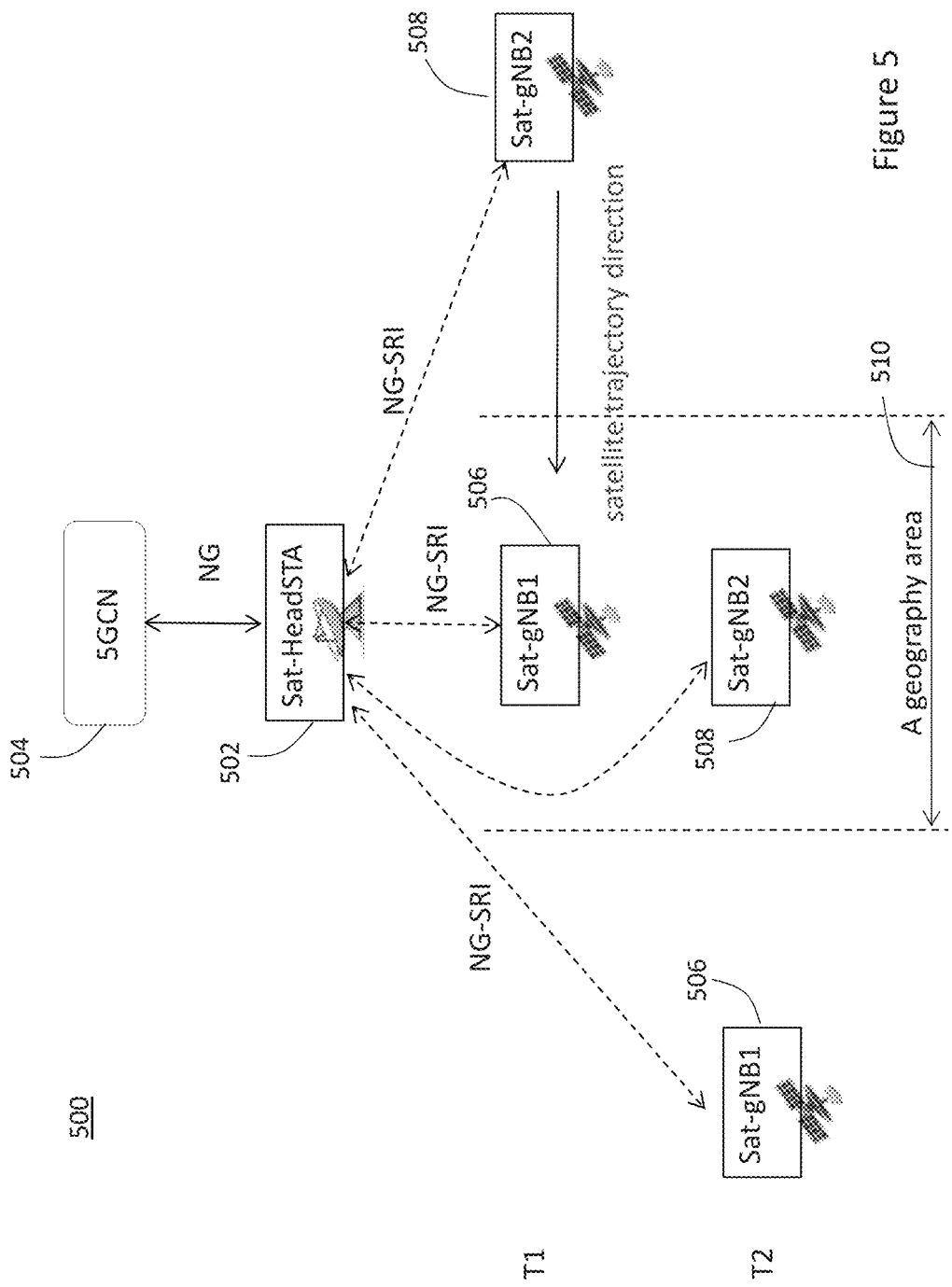
FIG. 5 illustrates an exemplary scenario of a non-terrestrial network in which techniques disclosed herein may be implemented, in accordance with some embodiments of the present disclosure.

FIG. 5 illustrates an exemplary scenario including a non-terrestrial (NT) network 500 in which UE handling methods disclosed herein can be implemented, in accordance with some embodiments. The NT network 500 includes a satellite head station 502 communicatively coupled to a core network 504 (e.g., a 5G CN) via a next generation (NG) communications link (e.g., a fiber optic line). The NT network 500 further includes a first satellite BS 506 and a second satellite BS 508, which move to the left in FIG. 5. At time T1, the first satellite BS 506 covers a particular geographic area 510 (i.e., provides cell coverage to the area). As the satellites 506 and 508 continue to travel, at time T2, the second satellite BS 506 takes over coverage of the geographic area 510. Thus, any UE in the geographic area 510 desiring to maintain or resume service must execute a handover to the second satellite BS 508. As shown in FIG. 5, both first and second satellite BSs 506 and 508 connect to the same SHS 502 on earth.

Figure 6:
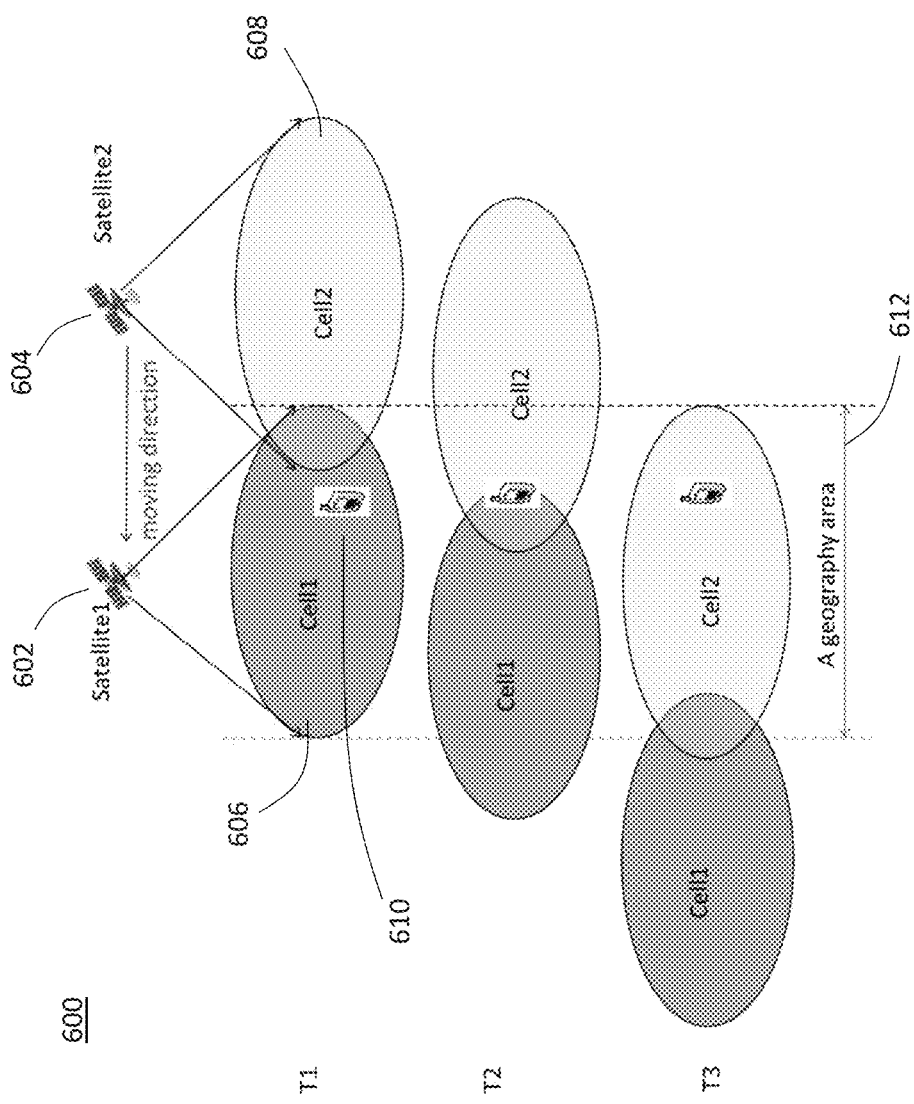
FIG. 6 illustrates an exemplary scenario in which a user equipment device changes geographic cells provided by satellites due to motion of the satellites, and in which techniques disclosed herein may be implemented, in accordance with some embodiments of the present disclosure.

FIG. 6 illustrates a possible scenario 600 in which the movement of satellites 602 and 604, each of which provides geographic cell coverage on the ground, causes the handover of a relatively stationary UE from one satellite to another. As shown in FIG. 6, the motion of the satellites 602 and 604 causes their respective geographic cells 606 and 608, defined by the field of view of their respective satellites 602 and 604, to move over time. At time T1, a UE 610 camped in geographic area 612 is contained completely in Cell1 606 of Satellite 602. However, at time T2, the coverage of Cell1 606 has moved significantly to the left such that the UE 610 is now at an edge of Cell1 606 and now contained in the coverage area of Cell2 608, which has also moved in similar fashion to Cell1 606. Then at time T3, the UE 610 is only in Cell2 608 radiated from Satellite2 604. Thus, at time T3, a handoff from Cell1 606 to Cell2 608 is necessary, and may even be desirable at time T2 when the UE 610 is within both cell's geographic areas.

As illustrated in FIG. 6, a UE 610 that is relatively stationary compared to the satellites 602 and 605 may require frequent handoffs or re-selection from one satellite/cell to another satellite/cell. Thus, UE associated information must be maintained and managed so that new satellites serving a UE can easily access the UE associated information and resume or continue service to the UE with minimal delays. In accordance with various embodiments, various methods for handling UE associated information in non-terrestrial networks are described below.

Figure 7:
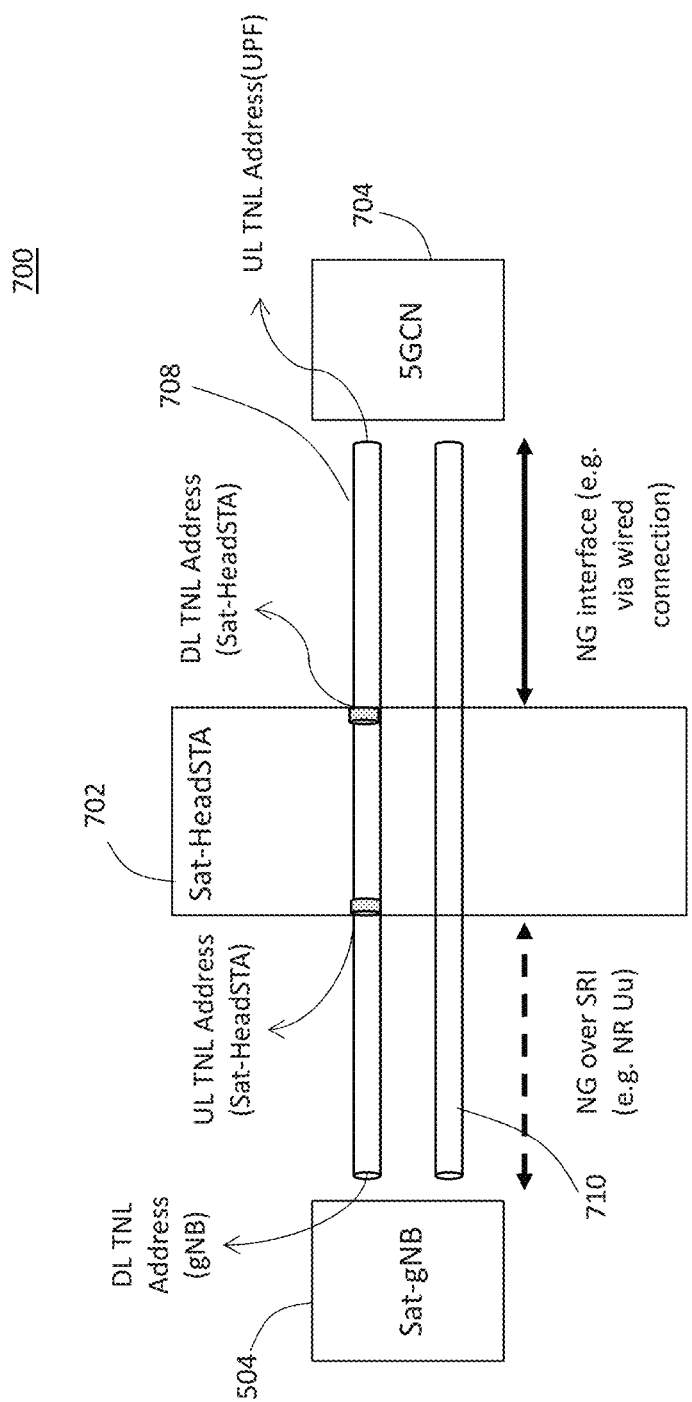
FIG. 7 illustrates an NT network having a satellite head station configured to translate UL and DL tunnel addresses for communications between a core network and a satellite base station, in accordance with some embodiments.

In some embodiments, the methods can be applied to NT networks employing regenerative satellites having on-board base stations (e.g., gNBs). FIG. 7 illustrates an NT network 700 having a satellite head station (SHS) 702 configured to translate UL and DL tunnel addresses for communications between a core network 704 (e.g., 5G core network) and a satellite base station 706 (e.g., Sat-gNB), as one aspect of handling UE associated information in the NT network, in accordance with some embodiments. For an end-to-end (E2E) packet data unit (PDU) session established between the core network 704 and the satellite base station 706, the E2E PDU session spans from the core network 704 to the SHS 702, and then from the SHS 702 to satellite BS 706. For each E2E PDU session, a UL Transport Network Layer (TNL) Address is allocated by the user plane function (UPF) of the core network 704 for delivery of UL PDUs (denoted as "UL TNL Address (UPF)" in FIG. 7). For DL PDUs, a DL TNL Address is allocated by the satellite BS 706 for delivery of the DL PDUs (denoted as "DL TNL Address (gNB)" in FIG. 7).

In accordance with various embodiments, the SHS 702 translates the UL TNL Address (UPF) to a second UL TNL address (designated as "UL TNL Address (Sat-HeadSTA)" in FIG. 7), which is allocated by the SHS 702. The SHS 702 sends the UL TNL Address (Sat-HeadSTA) to the satellite BS 706. For DL transmissions, the SHS 702 translates the DL TNL Address (gNB) to the DL TNL Address (Sat-HeadSTA) which is allocated by SHS 702 and sends the DL TNL Address (Sat-HeadSTA) to the UPF of the core network 704. In this way, when DL data from the core network 704 is transmitted to the UE for a PDU session, the UPF of the core network 704 transmits the DL data to the Sat-HeadSTA with the DL TNL Address destination set as DL TNL Address (Sat-HeadSTA). Then the SHS 702 forwards the DL data to the satellite BS 706 with the DL TNL Address destination set as DL TNL Address (gNB). Similarly, for UL data for the PDU session from the UE to the core network 704, after receiving the UL data from the UE, the satellite BS 706 transmits the UL data to the SHS 702 with the UL TNL Address destination set as UL TNL Address (Sat-HeadSTA). Then the SHS 702 forwards the UL data to the core network 704 with the UL TNL Address destination set as UL TNL Address (UPF).

In order to transmit DL and UL data associated with a PDU session, a communication link is established between the core network 704 and the satellite BS 706 currently serving a UE associated with the PDU session, wherein the communication link passes through or is relayed by the SHS 702. As shown in FIG. 7, in some embodiments, the communication link includes a first general packet radio service (GPRS) tunnel protocol for user plane data (GTP-U) tunnel 708 associated with a PDU session. A second GTP-U tunnel 710 is also established for another PDU session, which may be associated with the same UE or a different UE. Although only GTP-U tunnels are shown, in various embodiments, any number of GTP-U tunnels may be established between the core network 704 and the satellite BS 706 through the SHS 702. Each GTP-U tunnel has a TNL Address that includes an Internet Protocol (IP) Address and a GTP Tunnel Endpoint Identifier (GTP-TEID).

The translation of TNL addresses by the SHS 702 and the GTP-U tunnels formed through the SHS 702 facilitates handling of UE associated information when a UE is handed off from one satellite BS to another in an efficient manner, as described in further detail below.

Referring again to FIGS. 5 and 6, as an example scenario, when the UE 610 stays within the same geographic area 612 during a time period when the first cell 606 radiated from the first satellite 602 moves out of the geographic area 612 and the second cell 608, radiated from the second satellite 604, moves into the geographic area 612, a handoff from the first cell 606 to the second cell 608 must be performed (i.e., the UE 610 must switch its connection from the first satellite BS 602 to the second satellite BS 604).

Typically, a single SHS 702 can feed multiple (e.g., tens or hundreds of) satellite BSs (e.g., Sat-gNBs), although only two satellite BS are illustrated in the figures for ease of illustration and discussion. When a satellite BS flies from one region to another, it may change its connection from the SHS 702 of the original region to a different SHS that provides service to the second region. Thus, the number and identity of satellite BSs served by the SHS 702 may change over time as satellite BSs leave its coverage region and new satellite BSs enter its coverage region. In this non-terrestrial environment, it is expected that a large proportion of handovers would occur between two satellites BSs (Sat-gNBs) that are connected to the same SHS 702.

Figure 8:
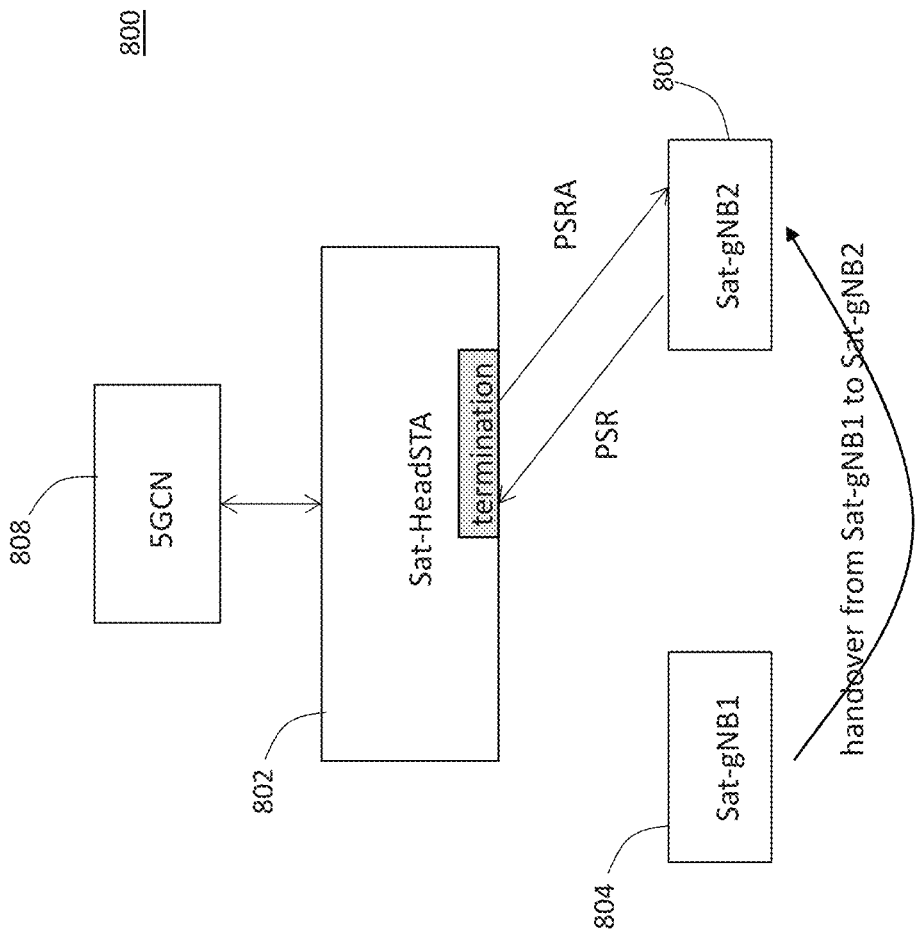
FIG. 8 illustrates a system for handling path switch requests from a satellite base station, in accordance with some embodiments of the present disclosure.

FIG. 8 illustrates a NT network 800 having a SHS 802 configured to perform handling of UE associated information after UE handoff, in accordance with an aspect of the invention. The NT network 800 further includes a first satellite BS 804 (Sat-gNB1), a second satellite BS 806 (Sat-gNB2) and a core network 808 (5GCN) communicatively coupled to the SHS 802. As discussed above with respect to FIG. 6, due to the movement of the satellite BSs 804 and 806, although the UE remains in the same geographic area, the UE will perform a handover to switch its connection from the first satellite BS 804 to the second satellite BS 806.

After the UE has successfully established a connection with the second satellite BS 806, the second satellite BS 806 initiates a path switch procedure for the UE to switch a downlink path associated with the UE. As shown in FIG. 8, the second satellite BS 806 sends a Path Switch Request (PSR) signal to the SHS 802, wherein the PSR is associated with the UE. The PSR includes the new DL TNL Address (e.g., "DL TNL Address (gNB) allocated by the second satellite BS 806 to switch the PDU session to the new DL TNL Address. With the reception of the PSR signal, the SHS 802 determines whether the UE handover is an intra-SHS handover (i.e., both the first and second satellite BSs 804 and 806 are served by the SHS 802). In some embodiments, the SHS 802 can determine whether the handover is an intra-SHS handover via a RAN UE NGAP ID included in the PSR. The ID can uniquely identify the UE associated with the NG interface within the SHS 802. If the RAN UE NGAP ID included in the PSR is recognized by the SHS 802, then the SHS 802 determines that the UE handover from one satellite to another is an intra-SHS handover.

If it is determined that the handover is an intra-SHS handover, the SHS 802 terminates the path switch procedure (i.e., does not forward the PSR to the core network 808. Instead, the SHS 802 responds with a Path Switch Request Acknowledge (PSRA) signal, and sends the PSRA signal directly to the second satellite BS 806. In accordance with some embodiments, the PSRA signal includes a UL TNL Address (e.g., the "UL TNL Address (Sat-HeadSTA)" as described above with respect to FIG. 7) for each PDU session. If it is determined that the handover is not an intra-SHS handover, the PATH SWITCH REQUEST is forwarded to the core network 808 to be handled in a conventional manner.

As discussed above, since the SHS 802 performs TNL address translation and offloads the path switch procedure for intra-SHS handovers from the core network 808, the signaling overhead to the core network 808 can be significantly reduced. It should be noted that such intra-SHS handovers can be caused by moving satellites and/or moving UEs. Additionally, the signaling overhead for handling UE associated information as a result of intra-SHS handovers is significantly reduced because the PSR is terminated in the SHS 802 (as shown in FIG. 8) instead of transferred to the core network every time due to handovers caused by moving satellites and/or moving UEs.

Figure 9:
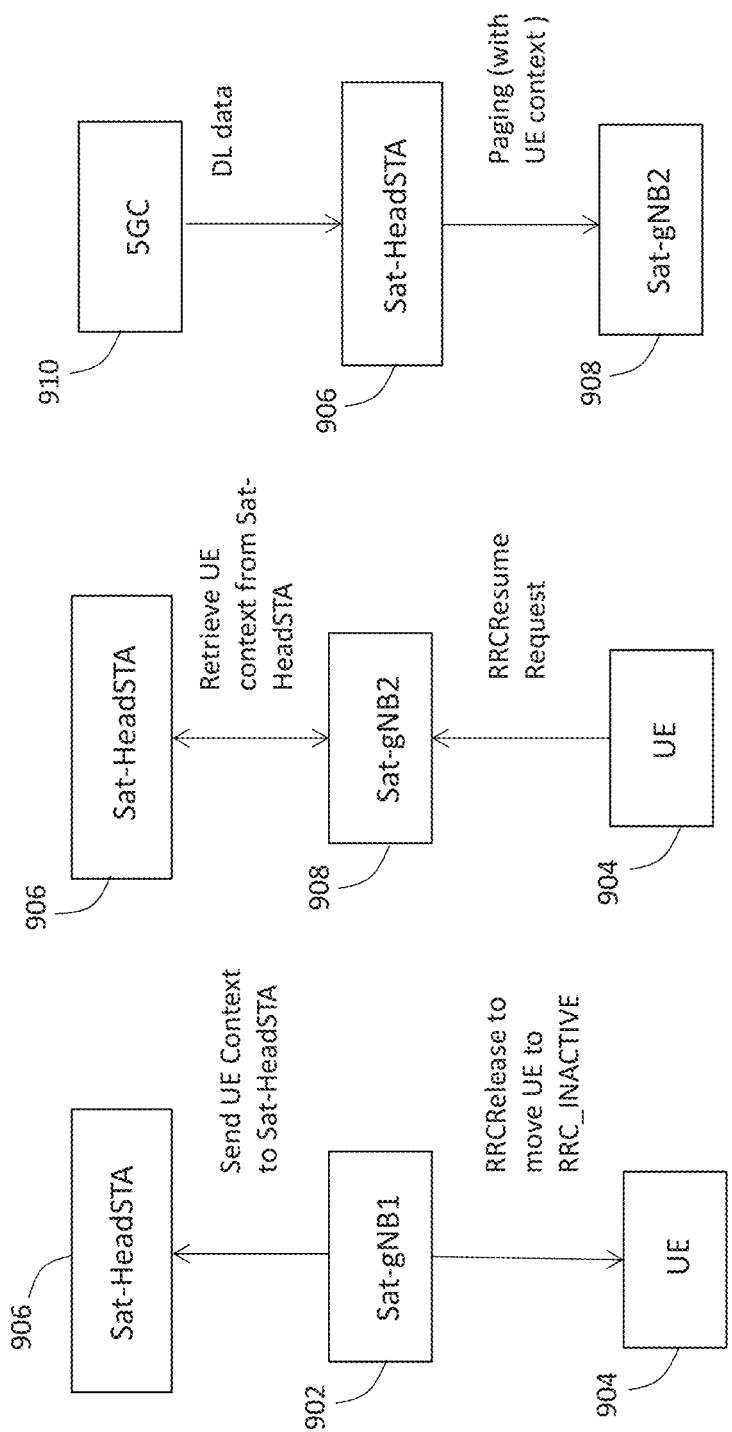
FIG. 9A illustrates a method for changing a user equipment device (UE) to an inactive state, in accordance with some embodiments of the present disclosure.
FIG. 9B illustrates a method for changing a UE to an active state, in accordance with some embodiments of the present disclosure.
FIG. 9C illustrates a method of paging one or more satellites to handle DL data for a UE, in accordance with some embodiments of the present disclosure.

FIG. 9A illustrates a method of storing UE context information when a UE transitions to an inactive state, in accordance with further embodiments of the invention. To reduce UE power consumption and allow the UE to resume a connection with a BS as soon as possible after it returns to an active state to handle pending incoming data, for example, the radio resource control (RRC) inactive state (i.e., the RRC_INACTIVE state) was introduced in the NR protocols. In NR, when the UE enters into the RRC_INACTIVE state, the UE context is stored both in UE and in the base station serving the UE when it enters the RRC_INACTIVE state, wherein the BS typically determines to move the UE from an active (i.e., RRC_CONNECTED state) to the RRC_INACTIVE state.

In a NT network, when a first satellite BS 902 (Sat-gNB1) decides to move a UE 904 it is currently connected to from an RRC_CONNECTED state to an RRC_INACTIVE state, the first satellite BS 902 sends a RRCRelease message to the UE 904, which instructs the UE 902 to enter into the RRC_INACTIVE state. The first satellite BS 902 also transfers UE context information for the UE 904 to a SHS 906, which stores the UE context information in a memory of the SHS 906. In accordance with various embodiments, the UE context includes at least one of the following:

UE Security Capabilities: including Encryption Algorithms, Integrity Protection Algorithms, etc.;
Security Information: including Key NG-RAN Star; Next Hop Chaining Count
UE Aggregate Maximum Bit Rate;
PDU Session related information: including PDU Session ID, PDU Session Resource Aggregate Maximum Bitrate, QoS Flow information of the PDU session etc.;
RRC Context in the source gNB (i.e., the gBN from which the UE enters into an RRC_INACTIVE state);

It should be noted that the sending of the RRCRelease signal and the UE context information can be performed one after another or performed at the same time. The order is determined by the satellite BS 902 implementation.

When the UE 904 in an RRC_INACTIVE state wants to resume its RRC connection (e.g., when there's UL data for transmission, or the UE needs to perform a tracking area update, or the UE needs to perform RAN area update, etc.), the UE initiates a RRC resume procedure. However, due to movement of the satellite BSs that cover a particular geographic area, as discussed above, even when the UE remains relatively stationary, the UE may initiate the RRC resume procedure with a new satellite BS (Sat-gNB2) that is different from the satellite BS (Sat-gNB1) it was connected to when it entered into an inactive state (e.g., RRC_INACTIVE state). In this scenario, as shown in FIG. 9B, the UE sends a RRCResumeRequest signal to a second satellite BS 908 (Sat-gNB2). Upon receiving the RRCResumeRequest, if the second satellite BS 908 decides to resume the RRC connection for the UE 902, the second satellite BS 908 initiates a procedure to retrieve the UE context information associated with the UE 902 from SHS 906. For example, the second satellite BS 908 may send a UE context request that identifies the UE 904 and, in response, the SHS 906 will transmit the requested UE context information to the second satellite BS 908. After receiving the UE context information, the second satellite BS 908 can resume or initiate a PDU session for the UE.

FIG. 9C illustrates a method of paging one or more satellite BSs, in accordance with further aspects of the invention. As illustrated in FIG. 9C, when a core network 910 (5GCN) transmits DL data for the RRC_INACTIVE UE to the SHS 906, the SHS 906 initiates a paging procedure, in accordance with some embodiments of the invention. In some embodiments, the SHS 906 sends a paging message to one or multiple satellite BSs (e.g., Sat-gNBs) identified based on one or more tracking areas (TAs) associated with the UE 904. The SHS 906 sends a Paging message to the identified one or multiple satellite BSs (e.g. Sat-gNB1 and Sat-gNB2). In some embodiments, the UE context information is embedded in the Paging message. With the reception of Paging message from the SHS 906, the second satellite BS 908 sends a paging message over the NR Uu interface to page the UE 904. With the moving of the UE or satellites, the UE may receive the paging message from another satellite BS (e.g., Sat-gNB2) which is different from the satellite BS (e.g. Sat-gNB1) from which the UE entered into the RRC_INACTIVE state. In this way, when the second satellite BS 908 (Sat-gNB2) receives the RRCResumeRequest from UE as a response to the paging message, if the second satellite BS 908 decides to resume the RRC connection for the UE 904, the UE context is already on board and the RRC connection can be resumed in a prompt and efficient manner.

Figure 10:
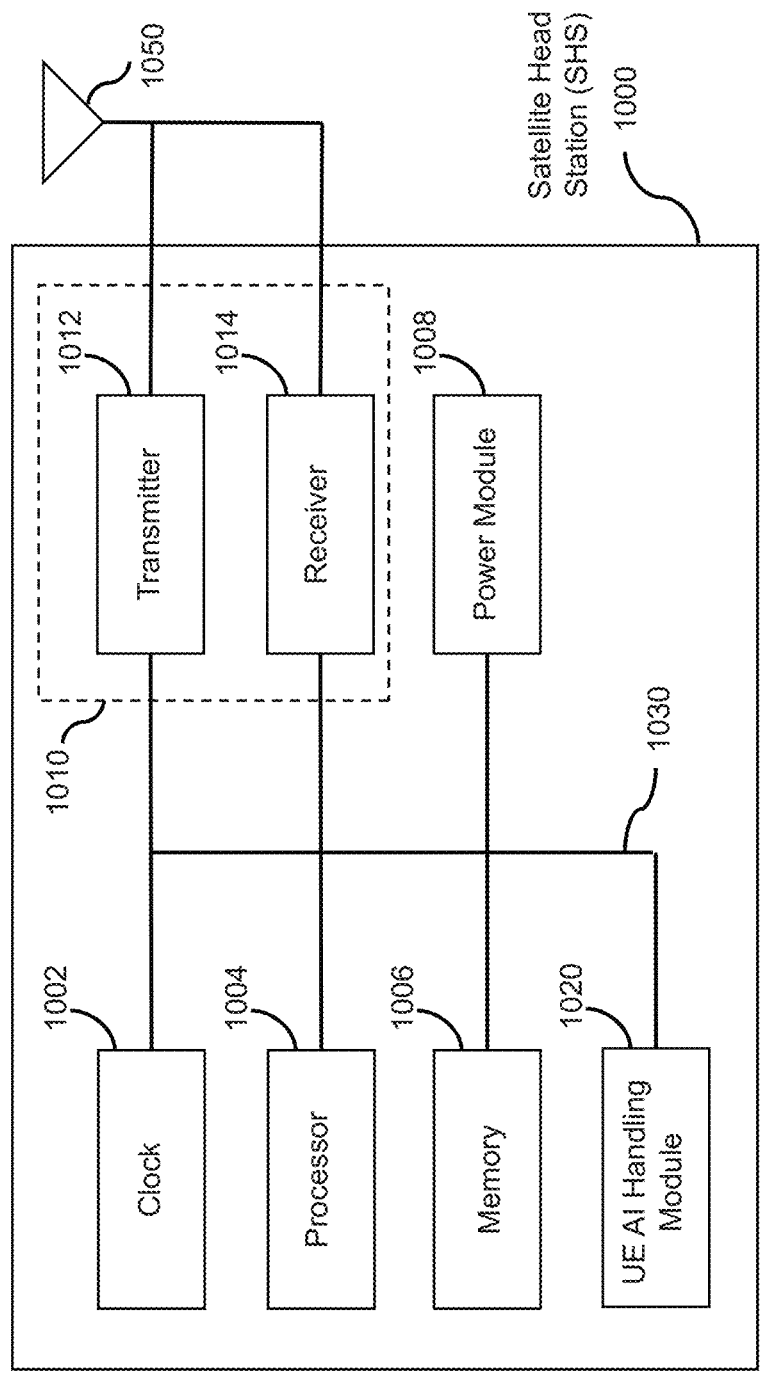
FIG. 10 illustrates a block diagram of some of the components of a satellite head station configured for performing the methods disclosed herein, in accordance with some embodiments of the present disclosure.

FIG. 10 illustrates a block diagram of a satellite head station (SHS) 1000 that can be configured to implement the various methods described herein. As shown in FIG. 10, the SHS 1000 includes a system clock 1002, a processor 1004, a memory 1006, a transceiver 1010 comprising a transmitter 1012 and receiver 1014, a power module 1008, and a UE Information handling module 1020.

In this embodiment, the system clock 1002 provides the timing signals to the processor 1004 for controlling the timing of all operations of the SHS 1000. The processor 1004 controls the general operation of the SHS 1000 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 1006, which can include both read-only memory (ROM) and random access memory (RAM), can provide instructions and data to the processor 1004. A portion of the memory 1006 can also include non-volatile random access memory (NVRAM). The processor 1004 typically performs logical and arithmetic operations based on program instructions stored within the memory 1006. The instructions (a.k.a., software) stored in the memory 1006 can be executed by the processor 1004 to perform the methods described herein. The processor 1004 and memory 1006 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 1010, which includes the transmitter 1012 and receiver 1014, allows the SHS 1000 to transmit and receive data to and from a remote device (e.g., a Sat-gNB). An antenna 1050 is electrically coupled to the transceiver 1010. In some embodiments, the antenna may be a phase-array antenna or other suitable antenna structure suitable for satellite communications. In various embodiments, the SHS 1000 includes (not shown) multiple transmitters, multiple receivers, and multiple transceivers. In some embodiments, the antenna 1050 can be a multi-antenna array that can form a plurality of beams each of which points in a distinct direction.

The UE Associated Information (AI) Handling module 1020 may be implemented as part of the processor 1004 programmed to perform the functions herein, or it may be a separate module implemented in hardware, firmware, software or a combination thereof. In accordance with various embodiments, the UE AI Handling module 1020 is configured to perform one or more of the methods or techniques disclosed herein, such as translating UL and DL TNL addresses to facilitate communications between a core network and a satellite BS, handling Path Switch Requests associated with intra-SHS handovers, storing and providing UE context information to assist with intra-SHS handovers, and paging satellite BSs, wherein the paging message contains UE context information, to facilitate with DL communications to a UE with minimal delay. In some embodiments, the UE AI Handling module 1020 can be implemented as software (i.e., computer executable instructions) stored in a non-transitory computer-readable medium that when executed by processor 1004, transform the processor 1004 into a special-purpose computer to perform the methods and operations described herein.

The various components and modules discussed above are coupled together by a bus system 1030. The bus system 1030 can include a data bus and, for example, a power bus, a control signal bus, and/or a status signal bus in addition to the data bus. It is understood that the modules of the SHS 1000 can be operatively coupled to one another using any suitable techniques and mediums.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a satellite head station, the method comprising:
    translating a first uplink (UL) tunnel address associated with a core network to a second UL tunnel address associated with the satellite head station, wherein the first and second UL tunnel addresses are each associated with a packet data unit (PDU) session established between the core network and a user equipment device (UE);
    transmitting the second UL tunnel address to a first satellite base station; and
    receiving UL data associated with the PDU session from the first satellite base station, wherein a UL tunnel address destination associated with the received UL data is set as the second UL tunnel address.

2. The method of claim 1, further comprising:
    translating a first downlink (DL) tunnel address associated with the first satellite base station to a second DL tunnel address associated with the satellite head station, wherein the first and second DL tunnel addresses are each associated with the PDU session;
    transmitting the second DL tunnel address to the core network; and
    receiving DL data associated with the PDU session from the core network, wherein a DL tunnel address destination associated with the received DL data is set as the second DL tunnel address.

3. The method of claim 2, further comprising:
    transmitting the DL data associated with the PDU session to the first satellite base station with a second DL tunnel address destination set as the first DL tunnel address; and
    transmitting the UL data associated with the PDU session to the core network with a second UL tunnel address destination set as the first UL tunnel address.

4. The method of claim 2, further comprising:
    when the UE handovers to a first geographic cell served by the first satellite base station from a second geographic cell served by a second satellite base station, receiving a path switch request (PSR) signal from the first satellite base station, wherein the PSR signal contains the first DL tunnel address;
    determining whether the second satellite base station is served by the satellite head station; and
    in response to determining that the second satellite base station is served by the satellite head station, transmitting a path switch request acknowledgement (PSRA) signal to the first satellite base station, wherein the PSRA signal contains the second UL tunnel address.

5. The method of claim 1, further comprising:
    receiving UE context information associated with a UE from the first satellite base station, wherein the UE is within a first geographic cell served by the first satellite base station and in an inactive state during a first time period; and
    storing the UE context information in a memory of the satellite head station.

6. The method of claim 5, further comprising:
    receiving a request for the UE context information from a second satellite base station, wherein the UE is within a second geographic cell served by the second satellite base station during a second time period; and
    transmitting the UE context information to the second satellite base station.

7. The method of claim 5, further comprising:
    receiving downlink data from the core network, wherein the downlink data is associated with the PDU session and the PDU session is associated with the UE; and
    sending a first paging message to at least one satellite base station, wherein the first paging message includes the UE context information.

8. A non-transitory computer-readable medium having stored thereon computer-executable instructions that when executed carry out the method of claim 1.

9. A satellite head station, comprising:
    at least one processor configured to translate a first uplink (UL) tunnel address associated with a core network to a second UL tunnel address associated with the satellite head station, wherein the first and second UL tunnel addresses are each associated with a packet data unit (PDU) session established between the core network and a user equipment device (UE); and
    a transceiver, coupled to the at least one processor, and configured to transmit the second UL tunnel address to a first satellite base station, and receive UL data associated with the PDU session from the first satellite base station, wherein the received UL data has a UL tunnel address destination set as the second UL tunnel address.

10. The satellite head station of claim 9, wherein:
    the at least one processor is further configured to translate a first downlink (DL) tunnel address associated with a first satellite base station to a second DL tunnel address associated with the satellite head station, wherein the first and second DL tunnel addresses are each associated with the PDU session; and
    the transceiver is further configured to transmit the second DL tunnel address to the core network, wherein DL data associated with the PDU session is transmitted from the core network with a DL tunnel address destination set as the second DL tunnel address.

11. The satellite head station of claim 10, wherein the transceiver is further configured to:
    transmit the DL data associated with the PDU session to the first satellite base station with a second DL tunnel address destination set as the first DL tunnel address; and transmit the UL data associated with the PDU session to the core network with a second UL tunnel address destination set as the first UL tunnel address.

12. The satellite head station of claim 9, wherein:
when the UE handovers to a first geographic cell served by the first satellite base station from a second geographic cell served by a second satellite base station, the transceiver is further configured to receive a path switch request (PSR) signal from the first satellite base station, wherein the PSR signal contains the first downlink tunnel address;
the at least one processor is further configured to determine whether the second satellite base station is served by the satellite head station; and
in response to determining that the second satellite base station is served by the satellite head station, the transceiver is further configured to transmit a path switch request acknowledgement (PSRA) signal to the first satellite base station, wherein the PSRA signal contains the second uplink tunnel address.

13. The satellite head station of claim 9, wherein:
the transceiver is further configured to receive UE context information associated with a UE from the first satellite base station, wherein the UE is within a first geographic cell served by the first satellite base station and in an inactive state during a first time period; and
wherein the satellite head station further comprises a memory for storing the UE context information.

14. The satellite head station of claim 13, wherein:
the transceiver is further configured to:
receive a request for the UE context information from a second satellite base station, wherein the UE is within a second geographic cell served by the second satellite base station during a second time period; and
transmit the UE context information to the second satellite base station.

15. The satellite head station of claim 13, wherein:
the transceiver is further configured to:
receive downlink data from the core network, wherein the downlink data is associated with the PDU session and the PDU session is associated with the UE; and
sending a first paging message to at least one satellite base station, wherein the first paging message includes the UE context information.

16. A satellite head station, comprising:
a transceiver configured to receiving UE context information from a first satellite base station during a first time period, wherein the UE context information is associated with a UE that is located within a first geographic cell of the first satellite base station and is in an inactive state;
a memory for storing the UE context information; and
at least one processor configured to translate a first downlink (DL) tunnel address associated with a first satellite base station to a second DL tunnel address associated with the satellite head station, wherein the first and second DL tunnel addresses are each associated with a packet data unit (PDU) session, and
wherein the transceiver is further configured to transmit the second DL tunnel address to a core network, wherein DL data associated with the PDU session is transmitted from the core network with a DL tunnel address destination set as the second DL tunnel address.

17. The satellite head station of claim 16, wherein:
the transceiver is further configured to:
receive a UE context retrieve message from a second satellite base station during a second time period when the UE is within a second geographic cell served by the second satellite base station; and
transmit the UE context associated with the UE to the second satellite base station.

18. The satellite head station of claim 16, wherein:
the transceiver is further configured to:
receive downlink data for the UE from a core network; and
sending a paging message to at least one satellite base station, wherein the paging message contains the UE context information stored in the memory.

19. The satellite head station of claim 16, wherein:
the transceiver is further configured to:
during a second time period when the UE is within a second geographic cell served by a second satellite base station, receiving a UE context retrieve message from the second satellite base station; and
transmitting the UE context associated with the UE to the second satellite base station.

20. The satellite head station of claim 16, wherein the first satellite base station is identified based on tracking area information associated with the UE.

* * * * *